United States Patent
Perry

(10) Patent No.: US 7,399,547 B2
(45) Date of Patent: Jul. 15, 2008

(54) FUEL AND AIR FLOW CONTROL IN A MULTI-STACK FUEL CELL POWER PLANT

(75) Inventor: Michael L. Perry, South Glastonbury, CT (US)

(73) Assignee: UTC Fuel Cells, LLC, SO. Windsor, CT (US)

( * ) Notice: Subject to any disclaimer, the term of this patent is extended or adjusted under 35 U.S.C. 154(b) by 562 days.

(21) Appl. No.: 10/981,183

(22) Filed: Nov. 5, 2004

(65) Prior Publication Data
US 2006/0099464 A1  May 11, 2006

(51) Int. Cl.
*H01M 8/04* (2006.01)
(52) U.S. Cl. .............................. 429/34; 429/35; 429/38; 429/39
(58) Field of Classification Search .................... 429/34
See application file for complete search history.

(56) References Cited

U.S. PATENT DOCUMENTS 6,541,148 B1 *  4/2003  Walsh et al. ................... 429/39
2003/0008194 A1 *  1/2003  Cargneli et al. ............... 429/39
2003/0099873 A1 *  5/2003  Brambilla et al. ............. 429/32
2004/0197625 A1 *  10/2004  Deshpande et al. ........... 429/26

FOREIGN PATENT DOCUMENTS

EP  0263052  *  9/1987

* cited by examiner

*Primary Examiner*—Raymond Alejandro
(74) *Attorney, Agent, or Firm*—William W. Jones

(57) ABSTRACT

A fuel cell power plant includes a plurality of fuel cell stacks which are operatively associated with each other so that both the air stream and fuel stream for the stacks are shared by each of the stacks in the power plant. The air and fuel streams are fed into an initial stack stage in the power plant, and after the air and fuel streams pass through the initial stack stage, the fuel exhaust streams are then fed into one or more subsequent stack stages in the power plant. The fuel streams are passed from the initial fuel cell stack stage to the subsequent fuel cell stack stage by means of a common manifold on which each of the fuel cell stacks in the power plant is mounted. The common manifold fuel stream passages are thermally insulated so as to limit water condensation in the fuel stream passages. The manifold may also include water condensation collection traps which will withdraw any water condensate that does form in the fuel stream passages.

5 Claims, 2 Drawing Sheets

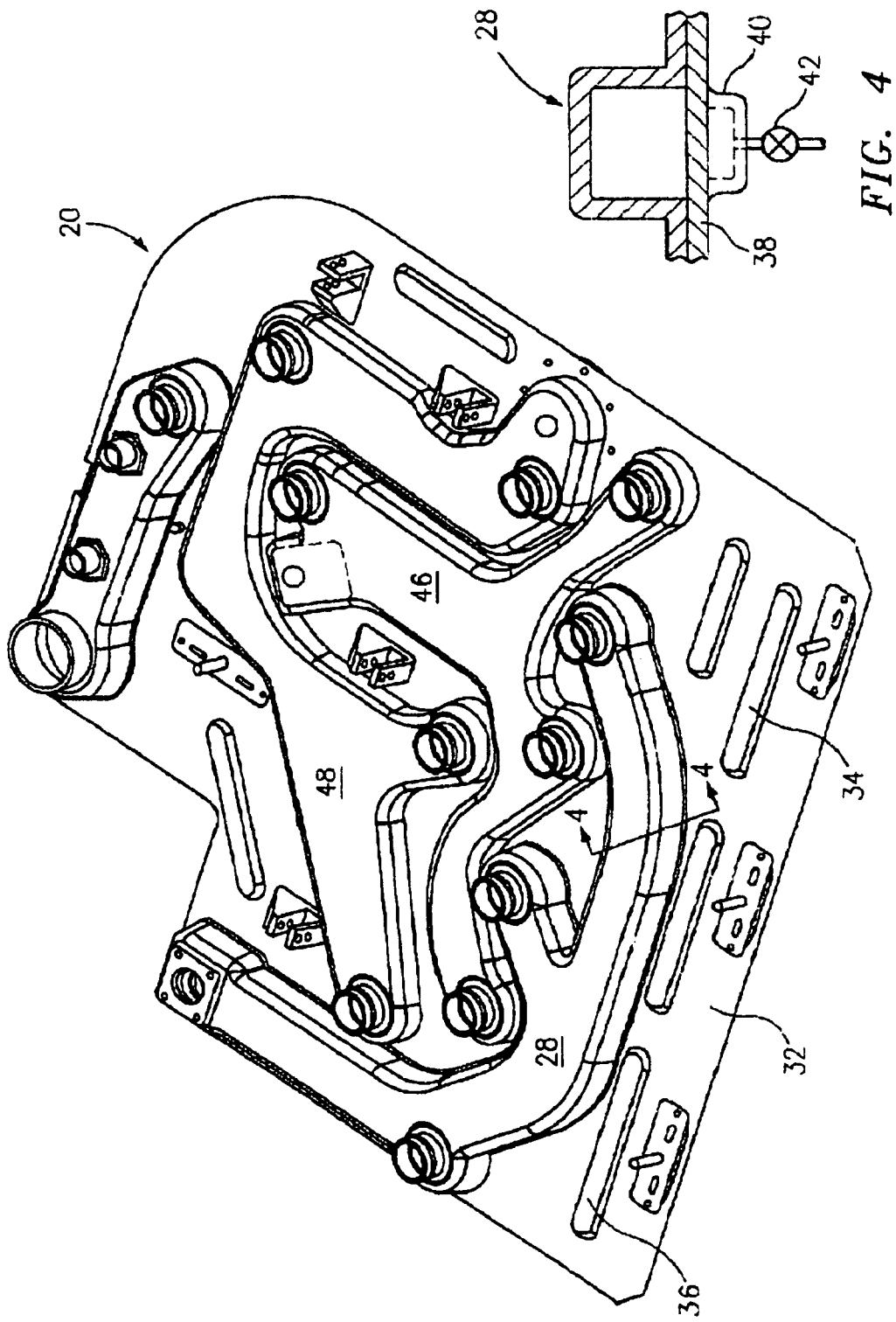

FUEL AND AIR FLOW CONTROL IN A MULTI-STACK FUEL CELL POWER PLANT

This invention concerns an improvement to a fuel and air flow control system for a multi-stack fuel cell power plant which is disclosed in copending commonly owned U.S. patent application Ser. No. 10/666,566, filed Sep. 22, 2003 published Mar. 24, 2005. The content of the aforesaid commonly owned patent application is incorporated herein in its entirety.

TECHNICAL FIELD

The present invention relates to a method and system for controlling the flow of air and fuel to a plurality of fuel cell stacks in a multi-stage fuel cell power plant wherein at least two fuel cell stacks in a first stage in the power plant are connected in tandem with one or more additional fuel cell stack(s) in a second stage in the power plant. More particularly, this invention relates to a method and system of the character described wherein all of the fuel cell stacks in the power plant are mounted on a thermally insulated common air and fuel-distributing manifold which feeds fuel to the fuel cell stacks in the first stage and then feeds first stage fuel exhaust to the fuel cell stack(s) in the second stage, whereby all of the fuel cell stacks in the power plant are operated with a single stream of fuel.

BACKGROUND OF THE INVENTION

Electricity is produced by fuel cell power plants which electrochemically convert a hydrocarbon-containing fuel stream, or a hydrogen stream, and an air stream into electrons and water. A fuel cell power plant can consist of a single fuel cell stack, or multiple fuel cell stacks. The choice of power plant configurations can depend on the desired electrical power output, and/or also on the available space that the power plant can occupy.

When the utility of having a plurality of interconnected fuel cell stacks is desirable, it has been suggested that fuel cell stacks in the power plant can be connected together in tandem, so that the fuel exhausted from a first stage of the stacks in the power plant can be routed to one or more fuel cell stack(s) in a second stage of the power plant and used as a fuel supply for the stack(s) in the second stage of the power plant. A schematic illustration of such a system is disclosed in European Patent Specification No. 0 263 052 B1, published Feb. 27, 1991. This patent publication shows multi stack fuel cell power plants wherein the stacks are supplied with reactants in parallel, in FIG. 1, and also wherein the stacks are supplied with reactants in tandem in FIGS. 2 and 3. The system described in the aforesaid patent publication suggests the use of a plurality of modular building block-type units for the several stages in the power plant. This approach involves the use of a plurality of reactant transfer lines from one stage to the next, which can become complicated and require complicated reactant transfer line assemblies.

It would be desirable to be able to utilize the tandem or serial connection approach for a multi-fuel cell stack power plant with a simplified connection between the individual stacks in the first stage of the power plant, and between the first stack stage and a subsequent stack stage in the power plant and which guards against water condensation in the fuel stream which is directed from the first stack stage to the subsequent stack stage. We have devised a simplified thermally insulated single manifold structure which accomplishes the aforesaid desirable result.

DISCLOSURE OF THE INVENTION

This invention relates to a multi-fuel cell stack power plant which employs a simplified fuel and air distribution mechanism which is thermally insulated so as to minimize water condensation in a transferred fuel stream. The fuel cell stack assembly portion of the power plant of this invention includes a plurality of separate fuel cell stacks which utilize common fuel and air streams to produce electricity. The fuel cell stacks are connected in parallel and in tandem so that a plurality of stacks form a first stage in the power plant, and one or more additional stacks form a second stage in the power plant. All of the stacks in each stage of the power plant are operatively connected to an intermediate thermally insulated fuel and air distribution manifold which directs fuel exhausted from the stacks in the first stage to the stack(s) in the second stage. The stacks in the first stage are fueled in parallel, and the stack(s) in the second stage are fueled in tandem with the first stage. The transfer of fuel from the first stage to the second stage is accomplished with minimum and uniform gas pressure drop so as to ensure that there will be no maldistribution of flow in the manifold from the first stage stacks to the second stage stacks. The distribution manifold is thermally insulated so as to minimize condensation in the fuel passage that distributes fuel from the first stack stage to a subsequent stack stage. The distribution manifold can also include condensation drains or water traps in the secondary fuel transfer passage to take care of an condensation that does occur in the fuel stream.

The manifold includes a fuel passage which receives fuel exhausted from the fuel cell stacks in stage one and directs that exhausted fuel to the fuel cell stack(s) in stage two. It is this fuel passage that is subjected to humid fuel gas stream, and that is provided with condensation drains and/or water traps to accommodate any condensed moisture from the fuel stream and to minimize condensed moisture transfer to the subsequent stack stage in the power plant.

It is therefore an object of this invention to provide a multi-stack fuel cell power plant which includes a first stack stage comprising a plurality of fuel cell stacks, and a subsequent stack stage comprising one or more additional fuel cell stacks, wherein the fuel cell stack(s) in the subsequent stage are fueled with fuel exhausted by the stacks in the first stage which fuel passes from the stacks in the first stage through a fuel transfer manifold passage to the stacks in the subsequent stage.

It is still another object of this invention to provide a fuel cell power plant of the character described wherein the manifold is thermally insulated from ambient surroundings so as to minimize moisture condensation in the fuel transfer manifold passage.

It is yet another object of this invention to provide a fuel cell power plant of the character described wherein the fuel transfer manifold passage includes moisture traps for capturing and moisture that does condense out of the fuel stream.

It is a further object of this invention to provide a fuel cell power plant of the character described wherein the manifold provides a structural support for adjunct power plant operating equipment such as a circuit board for collecting voltage readings from the cell stacks and the like.

BRIEF DESCRIPTION OF THE DRAWINGS

These and other objects and advantages of this invention will become more readily apparent to one skilled in the art from the following detailed description of a preferred embodiment of the invention when taken in conjunction with the accompanying drawings in which:

FIG. 3 is a perspective top view of a fuel and air distributing manifold for use in the power plant of FIG. 1 which manifold is formed in accordance with this invention; and FIG. 4 is cross sectional view taken along line 4-4 of FIG. 3.

SPECIFIC MODE FOR CARRYING OUT THE INVENTION

Figure 1:
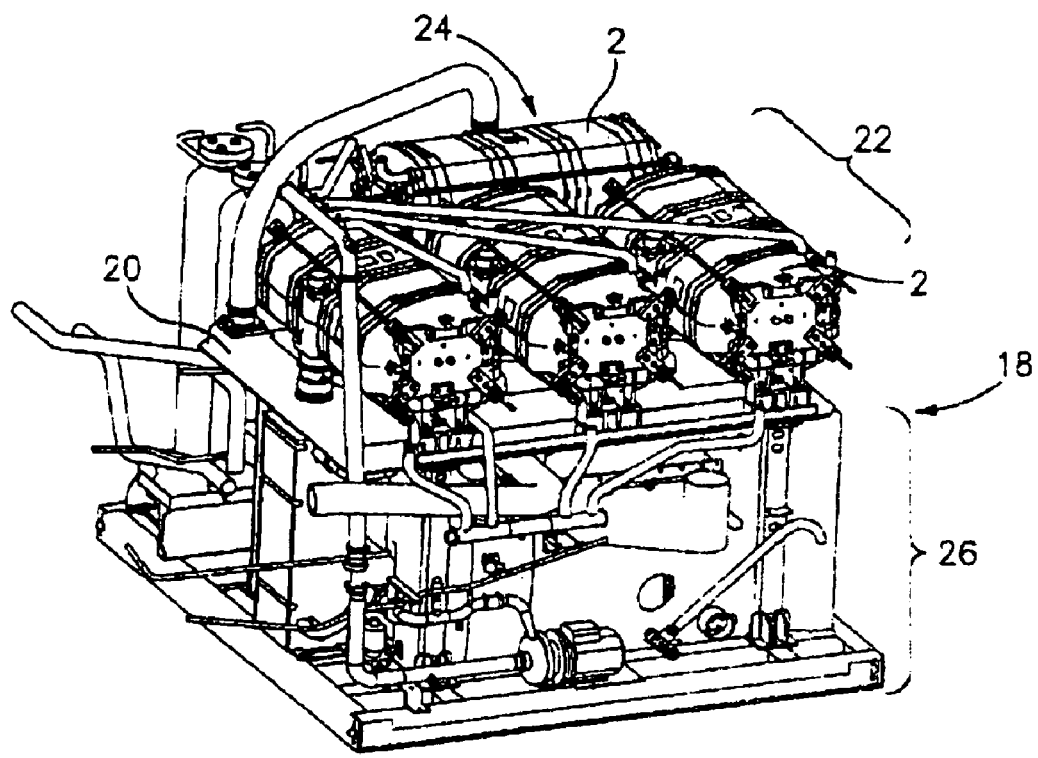
FIG. 1 is a perspective view of a portion of a two stage multi-fuel cell stack power plant formed in accordance with this invention.

Referring to FIG. 1, there is shown a modular fuel cell power section which is designated generally by the numeral 18. The power section 18 includes a plurality of fuel cell stacks 2 which are all mounted on a common gas distribution manifold 20. The stacks 2 are grouped into two stages which are a first stage 22, and a second stage 24. The first stage 22 includes less than all of the fuel cell stacks 2, and the second stage 24 includes the remaining additional fuel cell stack(s) 2. The power section 18 also includes a water and air management assembly component 26 which is a conventional fuel cell power plant assembly component.

Figure 2:
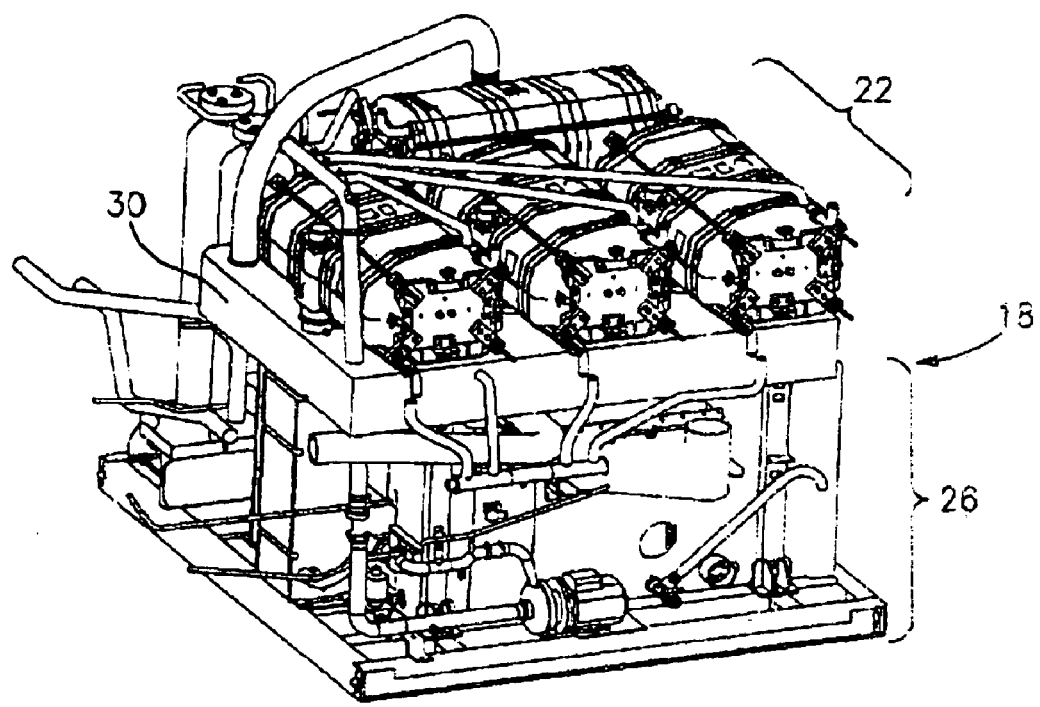
FIG. 2 is a perspective view similar to FIG. 1, but showing the manifold insulation component in place.

FIG. 2 depicts the assembly 18 of FIG. 1 with a thermal insulation component 30 that encases the manifold 20. The fuel gas stream that flows through the manifold 20 is quite humid and it is important to prevent condensation of water in the fuel stream passages since such water condensation can create a higher pressure drop in the fuel gas passages than desired, and/or mis-distribution of fuel gas flow. By having a thermal insulation component that encases the manifold 20, as shown in FIG. 2, all of the fuel gas and air passages will be compactly thermally insulated without the need to separately wrap insulate them. The thermal insulation component 30 can be formed from a fiberglass wrap, or a foam, such as a closed cell polyethylene foam.

FIG. 3 is a perspective view of the distribution manifold 20. The manifold 20 includes an inlet fuel gas distribution channel 28 which receives fuel exhausted from the first stack stage 22 and feeds the exhausted fuel to the second stack stage 24. The manifold 20 also includes air inlet and outlet distribution channels 46 and 48 for the stacks 2 in both stages 22 and 24. The manifold 20 includes a peripheral skirt 32 which can serve as a mounting support for adjunct components of the power plant. These adjunct components could include, for example, a voltage limiting device (shown schematically) 34, and a sub-stack voltage monitor 36 (shown schematically), for example.

The fuel gas distribution channel 28 can also be formed with condensed moisture traps, as shown in FIG. 4. The moisture traps can take the form of recesses 40 formed in a lower wall 38 of the manifold 20. The moisture traps 40 can also include valved drains 42 through which moisture can periodically be removed from the manifold 20 and transferred to a coolant accumulator (not shown) which can be located just below the manifold 20. The moisture traps 40 are particularly desirable during transient startup and shutdown phases of the power plant.

It will be readily appreciated that the power plant fuel cell stack assembly of this invention will eliminate or reduce the problem of water condensation in the fuel transfer conduit of the distribution manifold. The thermal insulation of the distribution manifold will retard water condensation in the fuel transfer conduit component of the manifold, and the provision of condensation traps in the fuel transfer conduit will eliminate any water from the fuel gas stream that does condense out of the fuel gas stream. Condensed water can then be transferred to a coolant storage component of the power plant. The distribution manifold also provides a structure for mounting of adjunct power plant monitoring components, as noted above.

Since many changes and variations of the disclosed embodiment of the invention may be made without departing from the inventive concept, it is not intended to limit the invention otherwise than as required by the appended claims.

What is claimed is:

1. A fuel cell power plant power section assembly comprising:
    a) a plurality of fuel cell stacks, said fuel cell stacks being being divided into at least two stages which are provided by a fuel gas stream in tandem with partially spent fuel from one stage being fed into a subsequent stage, said one stage including a plurality of fuel cell stacks, and said subsequent stage including at least one fuel cell stack;
    b) a unitary manifold assembly for use in controlling the flow of reactant gas streams between said plurality of fuel cell stacks in said one stage and said subsequent stage, said manifold assembly comprising a single fuel gas passage operatively connected to said plurality of fuel cell stacks in said one stage, said fuel gas passage being operative to receive partially expended fuel gas streams exhausted from said plurality of fuel cell stacks and to combine said partially expended fuel gas streams into a combined fuel gas stream, and said fuel gas passage also being operatively connected to said at least one fuel cell stack in said subsequent stage for directing the combined fuel gas stream to said at least one fuel cell stack in said subsequent stage, whereby the combined fuel gas stream is used to provide fuel for the subsequent stage fuel cell stack; and
    c) thermal insulation which thermally insulates said manifold assembly from ambient temperatures so as to limit moisture condensation in said fuel gas passage.

2. The power section assembly of claim 1 wherein said manifold assembly further comprises at least one condensed moisture trap in said fuel gas passage.

3. The power section assembly of claim 2 wherein said condensed moisture trap includes a drain for removing condensed moisture from said trap.

4. The power section assembly of claim 3 wherein said drain includes a valve for selectively controlling removal of condensed moisture from said trap.

5. The power section assembly of claim 1 further comprising fuel cell adjunct component mounts on said manifold assembly for mounting voltage-reading circuit boards, as well as other adjunct fuel cell power plant components.

* * * * *